United States Patent
Clements et al.

(10) Patent No.: US 10,682,706 B2
(45) Date of Patent: Jun. 16, 2020

(54) END FITTING AND METHOD OF MANUFACTURE

(71) Applicant: GE Oil & Gas UK Limited, Bristol (GB)

(72) Inventors: Richard Clements, Bristol (GB); John Gerard Rafferty, Bristol (GB); Paul Snowdon, Bristol (GB)

(73) Assignee: GE Oil & Gas UK Limited, Bristol (GB)

( * ) Notice: Subject to any disclaimer, the term of this patent is extended or adjusted under 35 U.S.C. 154(b) by 327 days.

(21) Appl. No.: 15/534,182

(22) PCT Filed: Dec. 7, 2015

(86) PCT No.: PCT/GB2015/053743
§ 371 (c)(1),
(2) Date: Jun. 8, 2017

(87) PCT Pub. No.: WO2016/092282
PCT Pub. Date: Jun. 16, 2016

(65) Prior Publication Data
US 2017/0341149 A1     Nov. 30, 2017

(30) Foreign Application Priority Data

Dec. 9, 2014   (GB) .................................. 1421894.5

(51) Int. Cl.
*B33Y 80/00*     (2015.01)
*B22F 5/10*      (2006.01)
(Continued)

(52) U.S. Cl.
CPC .............. *B22F 7/08* (2013.01); *B22F 3/1055* (2013.01); *B22F 5/106* (2013.01); *B29C 64/153* (2017.08);
(Continued)

(58) Field of Classification Search
CPC .......... B22F 7/08; B22F 3/1055; B22F 5/106; B33Y 50/02; B33Y 40/00; Y02P 10/295;
(Continued)

(56) References Cited

U.S. PATENT DOCUMENTS

| 6,923,477 B2 | 8/2005 | Buon et al. |
| 2007/0024051 A1* | 2/2007 | Witz .................. F16L 33/01 285/242 |

(Continued)

FOREIGN PATENT DOCUMENTS

| CN | 101896309 | 11/2010 |
| EP | 2918358 | 9/2015 |

(Continued)

OTHER PUBLICATIONS

Harris (Jan. 11, 2012) Additive Manufacturing and AMC [EWI Presentation].

(Continued)

*Primary Examiner* — Lee A Holly
(74) *Attorney, Agent, or Firm* — Knobbe, Martens, Olson & Bear, LLP

(57) ABSTRACT

A method, a component part of an end fitting and a preformed member for manufacturing a component part of an end fitting are disclosed. The method comprises the steps of, via an additive process, providing a near net shape (NNS) precursor corresponding to a component part of an end fitting layer-by-layer and subsequently performing at least one post NNS processing operation on the NNS precursor to provide the component part.

12 Claims, 10 Drawing Sheets

(51) Int. Cl.
| | |
|---|---|
| *F16L 33/01* | (2006.01) |
| *B33Y 10/00* | (2015.01) |
| *F16L 11/20* | (2006.01) |
| *F16L 11/14* | (2006.01) |
| *B22F 7/08* | (2006.01) |
| *B29C 64/153* | (2017.01) |
| *B22F 3/105* | (2006.01) |
| *B33Y 40/00* | (2020.01) |
| *F16L 55/07* | (2006.01) |
| *B33Y 50/02* | (2015.01) |
| *F16L 33/18* | (2006.01) |

(52) U.S. Cl.
CPC .............. *B33Y 10/00* (2014.12); *B33Y 40/00* (2014.12); *B33Y 50/02* (2014.12); *B33Y 80/00* (2014.12); *F16L 33/01* (2013.01); *F16L 55/07* (2013.01); *F16L 11/14* (2013.01); *F16L 11/20* (2013.01); *F16L 33/18* (2013.01); *Y02P 10/295* (2015.11)

(58) Field of Classification Search
CPC . F16L 33/01; F16L 11/14; F16L 33/18; F16L 55/07; F16L 11/20; B29C 64/153
See application file for complete search history.

(56) References Cited

U.S. PATENT DOCUMENTS

| | | | |
|---|---|---|---|
| 2009/0269497 A1* | 10/2009 | Yousefiani | ............ B22F 3/1055 427/258 |
| 2010/0266438 A1 | 10/2010 | Gensert | |
| 2010/0279007 A1 | 11/2010 | Briselden et al. | |
| 2011/0070394 A1* | 3/2011 | Hopkins | ............ G05B 19/4099 428/80 |
| 2012/0031516 A1 | 2/2012 | Yori et al. | |
| 2014/0084583 A1 | 3/2014 | Hemingway et al. | |
| 2014/0124076 A1 | 5/2014 | Roberts et al. | |
| 2015/0158244 A1* | 6/2015 | Tibbits | .................. C08F 220/20 428/516 |

FOREIGN PATENT DOCUMENTS

| | | |
|---|---|---|
| GB | 2271157 | 4/1994 |
| GB | 2438753 | 12/2007 |
| WO | WO 2007/144552 | 12/2007 |
| WO | WO 2011/160109 | 12/2011 |
| WO | WO 2014/012971 | 1/2014 |
| WO | WO 2015/148873 | 10/2015 |

OTHER PUBLICATIONS

Colegrove (2013) High Deposition Rate High Quality Metal Additive Manufacture Using Wire + Arc Technology [Cranfield University Presentation].

International Preliminary Report on Patentability for International Application No. PCT/GB2015/053743 dated Jun. 13, 2017.

International Search Report and Written Opinion for International Application No. PCT/GB2015/053743 dated Mar. 22, 2016.

Brazilian Search Report for Application No. BR112017011467-4, 3 pages.

* cited by examiner

END FITTING AND METHOD OF MANUFACTURE

The present invention relates to an end fitting and to apparatus and a method for manufacturing an end fitting for a flexible pipe. In particular, but not exclusively, the present invention relates to the manufacture of an end fitting for a flexible pipe whereby at least one component part of the end fitting is formed first as a near net shape (NNS) precursor via an additive process and then subsequently refined to provide the component part.

Traditionally flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The pipe may have an internal diameter of typically up to around 0.6 meters (e.g. diameters may range from 0.05 m up to 0.6 m). Flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Depending upon the layers of the flexible pipe used and the type of flexible pipe some of the pipe layers may be bonded together or remain unbonded.

Some flexible pipe has been used for deep water (less than 3,300 feet (1,005.84 meters)) and ultra-deep water (greater than 3,300 feet) developments. It is the increasing demand for oil which is causing exploration to occur at greater and greater depths (for example in excess of 8202 feet (2500 meters)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the pressure armour and tensile armour layers of the flexible pipe body is increased. It is noted for the sake of completeness that flexible pipe may also be used for shallow water applications (for example less than around 500 meters depth) or even for shore (overland) applications.

Conventionally flexible pipe comprises a length of flexible pipe body (sometimes referred to as a segment of flexible pipe body) terminated at at least one end via an end fitting. Conventional end fittings include multiple component parts cast from a base metal such as steel or stainless steel. These component parts are secured together to provide a rigid end to the flexible pipe body. Conventionally some end fittings contain small-bore gas pressure relief passages or lumens used as conduits for ancillary monitoring equipment or flare off points. The passages have traditionally taken the form of holes drilled through the solid body of one or more of the end fitting component parts. Thus these straight holes have been conventionally drilled through steel or alloy walls of the end fitting components and thereafter connected using commercial connectors and tubing of either a stainless steel or polymer based material. Such conventional techniques have the advantage of being cheap and offering relatively easy to assemble end fittings. The end fitting component materials themselves however present a vulnerability in the form of being bare alloy or bare steel bore surfaces along any holes or lumens drilled through the end fitting components to which ancillary tubing is attached. This is particularly disadvantageous in the circumstances where the flexible pipe is placed in so-called "sour" service. In such service production fluids transported by the flexible pipe body can include acid gas species such as $H_2S$. This is particularly an issue when acidic gases must be exhausted from an annulus region of the flexible pipe body which can lead to corrosion of the through passageways and also lead to migration of atomic hydrogen, released during the corrosion reaction, to points of high stress or inclusions in the end fitting material. Re-combination in to molecular hydrogen gas with a commensurate significant volume increase results in a local build-up of pressure in the metal structure and potentially what is known as hydrogen cracking of the material. As a result end fittings to be used for flexible pipes where sour service is to be anticipated must conventionally be manufactured from corrosion resistant alloys. For example an entire main body component of an end fitting must be manufactured from nickel alloy 625 or duplex or super duplex stainless steel. This is an expensive process.

Equally any passageways which must be provided through the end fitting components must thereafter be drilled through such material. This can be a time consuming and costly process and there are limitations on the routes such passageways can be made to follow.

It is an aim of the present invention to at least partly mitigate the above-mentioned problems.

It is an aim of certain embodiments of the present invention to provide an end fitting and a method of manufacturing an end fitting whereby precursors of one or more component parts of the end fitting can be generated first via an additive manufacturing (AM) technique.

It is an aim of certain embodiments of the present invention to provide a method of manufacturing an end fitting component part which incorporates substantive regions of a base material but which includes integrally formed regions of a further material having improved physical characteristics at desired locations.

It is an aim of certain embodiments of the present invention to provide a method of manufacturing an end fitting and an end fitting in which one or more fluid communicating passageways can be provided through the component part which are not straight or linear and which could not otherwise be provided by conventional techniques.

According to a first aspect of the present invention there is provided a method of manufacturing a component part of an end fitting for a flexible pipe, comprising the steps of:
    via an additive process, providing a near net shape (NNS) precursor corresponding to a component part of an end fitting layer-by-layer; and
    subsequently performing at least one post NNS processing operation on the NNS precursor to provide the component part.

Aptly the method further comprises, via the additive process, providing the NNS precursor with at least one region of a first material integrally formed with a base material of the NNS precursor, said base material being different from the first material.

Aptly the method further comprises providing each region of the first material at a location where a fluid communication passageway is provided in the component part.

Aptly the method further comprises providing the fluid communication passageway as an interconnected void space in adjacent layers in a region of the first material as layers of the NNS precursor are provided.

Aptly the method further comprises, via the void space, providing a non-linear lumen through said a region.

Aptly the non-linear lumen is provided as a lumen having a curved or labyrinthine passageway through said a region.

Aptly the method further comprises providing the fluid communication passageway by subsequently drilling at least one bore in a region of the first material.

Aptly the method further comprises providing a planar starting base plate member; and
  layer-by-layer, adding a new layer of base material and/or the first material at selected locations on an underlying layer supported via the base plate member.

Aptly the method further comprises providing a starting preform member; and
  layer-by-layer, adding a new layer of base material and/or the first material at selected locations on an underlying layer supported via the preform member.

Aptly the method further comprises providing the starting preform member by providing a nickel alloy tube.

Aptly the starting preform member is a steel tube or steel section and the steps of adding a new layer layer-by-layer comprises providing at least one nickel alloy layer over the preform member and subsequently providing at least one base material layer over the nickel alloy layer.

Aptly the method further comprises subsequently removing the steel tube or steel section.

Aptly the method further comprises providing the starter preform member by providing a starting preform member manufactured from a material that is more corrosion resistant than steel but less expensive than nickel alloy.

Aptly the method further comprises the preform member is a tubular or frusto conical or curve shaped member.

Aptly the method further comprises delivering a metal for the additive process as a powder or wire.

Aptly the method further comprises providing geometric data input representing the component part of an end fitting.

Aptly the method further comprises providing a build sequence for the additive process.

Aptly the method further comprises determining at least one tool path for each tool at an Additive Manufacturing (AM) cell that performs at least a step of the additive process.

Aptly the at least one tool comprises a deposition robot or machining robot or a part manipulator.

Aptly the method further comprises determining at least one operation parameter for the additive process.

Aptly the at least one operation parameter comprises one of a temperature of a heat source, a supply rate for incoming metal and an angle of incidence of the metal with respect to an in-place substrate.

Aptly the method further comprises working a portion of an exposed surface of a substrate subsequent to generation of a substrate layer on an underlying layer, and prior to the addition of a subsequent layer on the substrate.

Aptly the method further comprises working the portion of the exposed surface by applying mechanical or thermal treatment to the surface.

Aptly the method further comprises working the portion of the exposed surface by applying local plastic defamation to the exposed surface.

Aptly the step of providing a region of a first material comprises providing a region of a Corrosion Resistant Alloy (CRA) in the base material of the NNS precursor.

Aptly the method further comprises the CRA is nickel alloy or duplex stainless steel or super duplex stainless steel and the base material is stainless steel or carbon steel.

According to a second aspect of the present invention there is provided a component part of an end fitting for a flexible pipe, comprising:
  at least one region of a first material integrally formed with a further region of a base material; wherein
  at least one physical characteristic of the first material is different from the base material.

Aptly the component part is a main body part or jacket or flange connector of an end fitting.

Aptly said at least one region comprises a non-surface region of the component part.

Aptly said at least one region comprises a region in the component part more than 1 mm from an outer surface.

Aptly the component part further comprises at least one fluid communication passageway provided in the at least one region.

Aptly the fluid communication passageway is a non-linear lumen through the at least one region.

Aptly the fluid communication passageway extends from the at least one region and through at least a portion of the base material.

Aptly the fluid communication passageway extends from a first surface on a corresponding first side of the component part to a further surface on a corresponding further side of the component part.

Aptly the first material is a corrosion resistant alloy (CRA).

Aptly the CRA is nickel alloy or duplex stainless steel or super duplex stainless steel.

According to a third aspect of the present invention there is provided a preformed member for manufacturing a component part of an end fitting for a flexible pipe, comprising:
  a tubular element manufactured from a preformer material providing associated physical characteristics; wherein
  a surface region of the tubular element is disposed to provide an exposed surface of an end fitting component part and a remainder surface region of the tubular element is disposed to provide a starting substrate on which layers can subsequently be added via an additive process to provide a near net shape (NNS) element comprising the tubular element and corresponding to a component part of an end fitting.

Aptly a cross section of the tubular member is symmetrical.

Aptly a cross section of the tubular member is constant along a length of the tubular member.

According to a fourth aspect of the present invention there is provided an end fitting for a flexible pipe including at least one component part comprising at least one region of a first material integrally formed with a further region of a base material; wherein
  at least one physical characteristic of the first material is different from the base material.

According to a fifth aspect of the present invention there is provided a flexible pipe comprising an end fitting which comprises at least one component part that comprises at least one region of a first material integrally formed with a further region of a base material; wherein at least one physical characteristic of the first material is different from the base material.

According to a sixth aspect of the present invention there is provided a product which comprises a computer program comprising program instructions for:

via an additive process, providing a near net shape (NNS) precursor corresponding to a component part of an end fitting layer-by-layer.

Aptly the program instructions are for determining operation of at least one tool at an additive manufacturing (AM) cell.

According to a seventh aspect of the present invention there is provided a method substantially as hereinbefore described with reference to the accompanying drawings.

According to an eighth aspect of the present invention there is provided apparatus constructed and arranged substantially as hereinbefore described with reference to the accompanying drawings.

Certain embodiments of the present invention provide a method of manufacturing a component part of an end fitting via an additive process whereby a Near Net Shape (NNS) precursor corresponding to a desired component part of an end fitting is formed and subsequently processed to provide a component part of an end fitting. The component part can include passageways in locations not previously available via conventional techniques. Alternatively or additionally regions of the component part can be formed from materials having favourable physical characteristics with respect to a remaining major portion of the end fitting component which can otherwise be made from other cheaper or easier to form materials.

Certain embodiments of the present invention provide a method of manufacturing end fitting components using additive manufacturing which saves on time and cost in machining and which also have integral to them corrosion resistant surfaces in bore and/or through orifice regions where potentially corrosive gases are to be expected in operation.

Certain embodiments of the present invention provide an end fitting formed from materials and having a design which makes a risk of hydrogen cracking of the end fitting material far less likely than with conventional techniques.

Certain embodiments of the present invention provide for through holes in an end fitting component part to follow a contorted or labyrinthine path to navigate around undesired regions of the component part such as areas where bolt holes pass through an end fitting.

Certain embodiments of the present invention provide for corrosion resistant passageways or bores through an end fitting and/or allow passageways to follow non straight pathways.

Certain embodiments of the present invention provide for corrosion resistant passageways or bores through an end fitting and/or allow passageways providing interconnections between internal corrosion resistant material lined internal void chambers in the end fitting body structure.

Certain embodiments of the present invention enable one or more regions of an end fitting component part to have physical characteristics tailored to the performance desired from that region.

Embodiments of the present invention will now be described hereinafter, by way of example only, with reference to the accompanying drawings in which.

Figure 6:
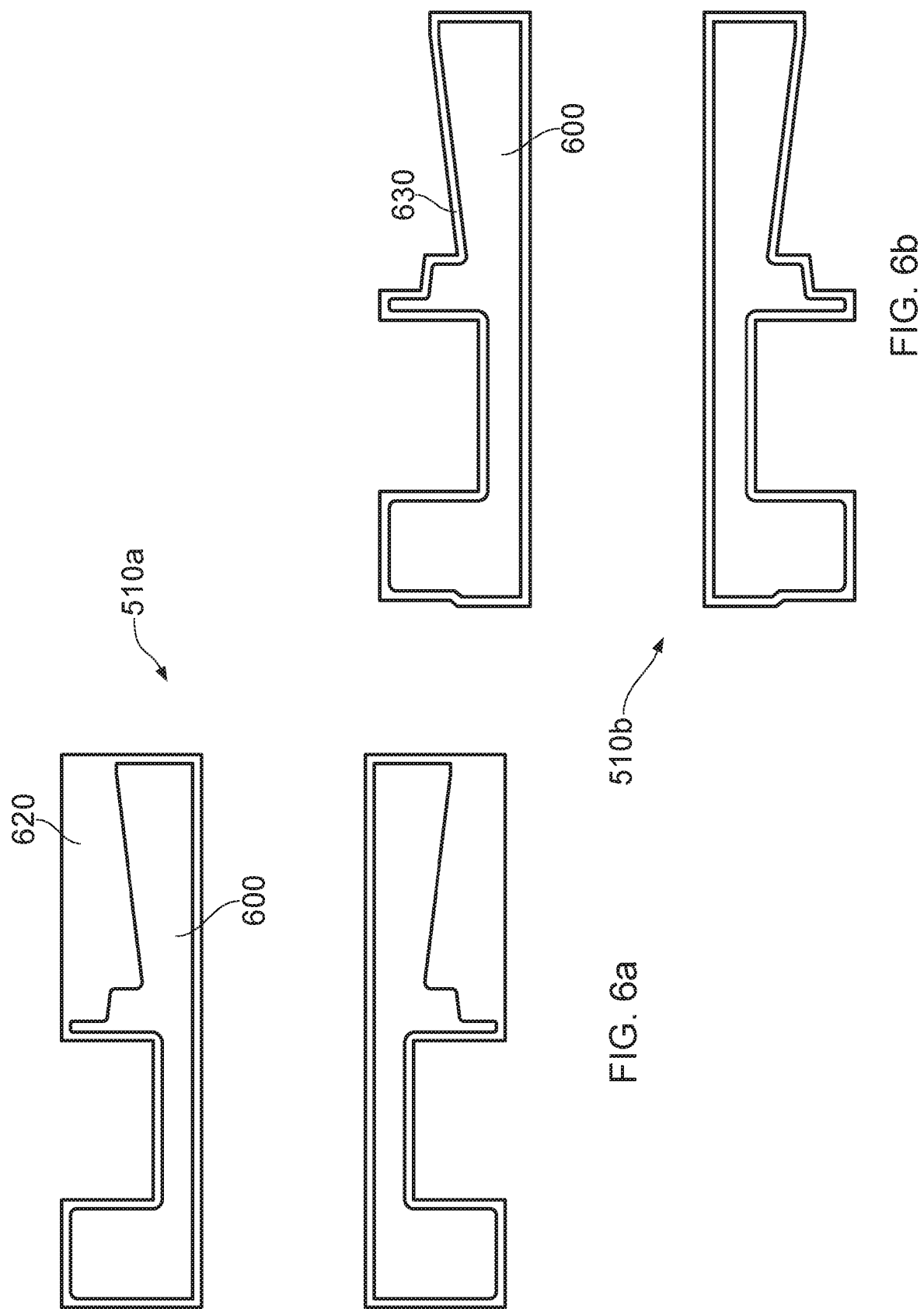
Figure 7:
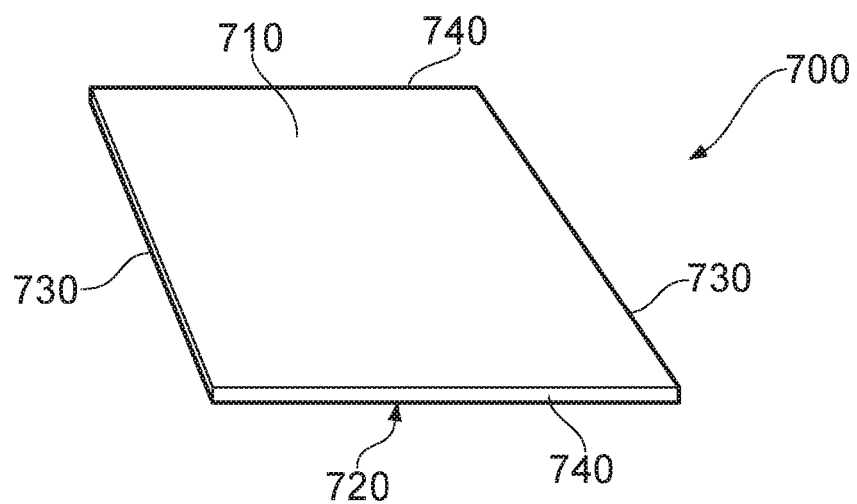
Figure 8:
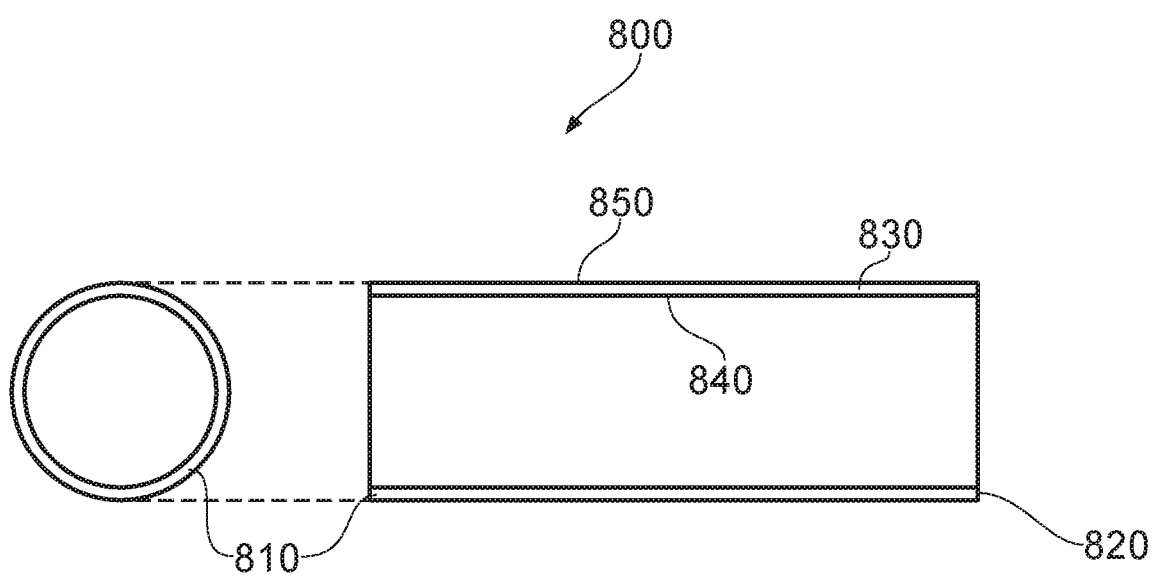
Figure 9:
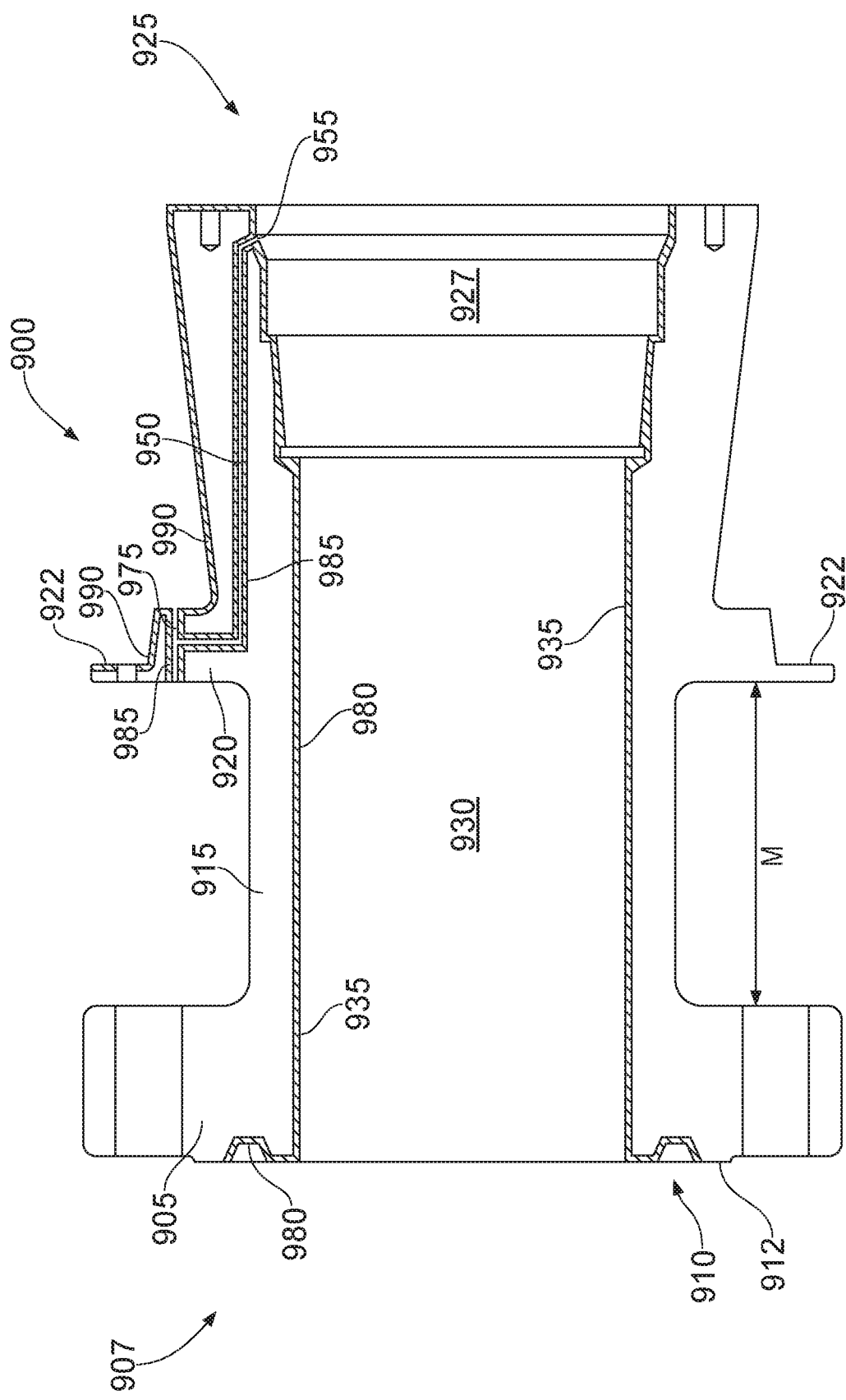

FIGS. 6a and 6b each illustrate a Near Net Shape precursor;

FIG. 7 illustrates a planar substrate;

FIG. 8 illustrates a cylindrical substrate;

FIG. 9 illustrates an alternative end fitting component part; and

Figure 10:
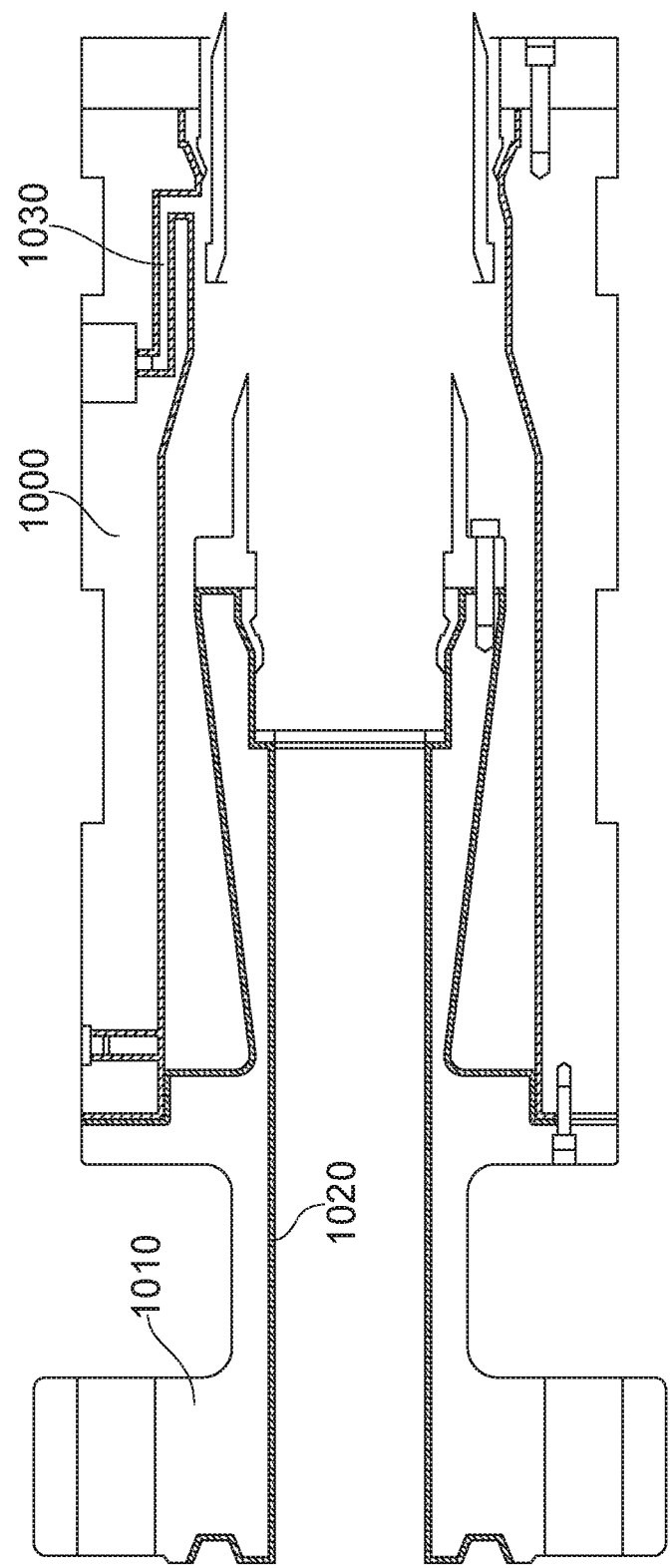

FIG. 10 illustrates flexible pipe body terminated in an end fitting.

In the drawings like reference numerals refer to like parts.

Throughout this description, reference will be made to a flexible pipe. It is to be appreciated that certain embodiments of the present invention are applicable to use with a wide variety of flexible pipe. For example, and as described in more detail below, certain embodiments of the present invention can be used with respect to flexible pipe and associated end fittings of the type which is manufactured according to API 17J. Such flexible pipe is often referred to as unbonded flexible pipe. Likewise certain other embodiments of the present invention are usable with flexible pipe and associated end fittings for flexible pipe of a composite type structure. Such composite type flexible pipe and its manufacture is currently being standardised by the API.

Figure 1:
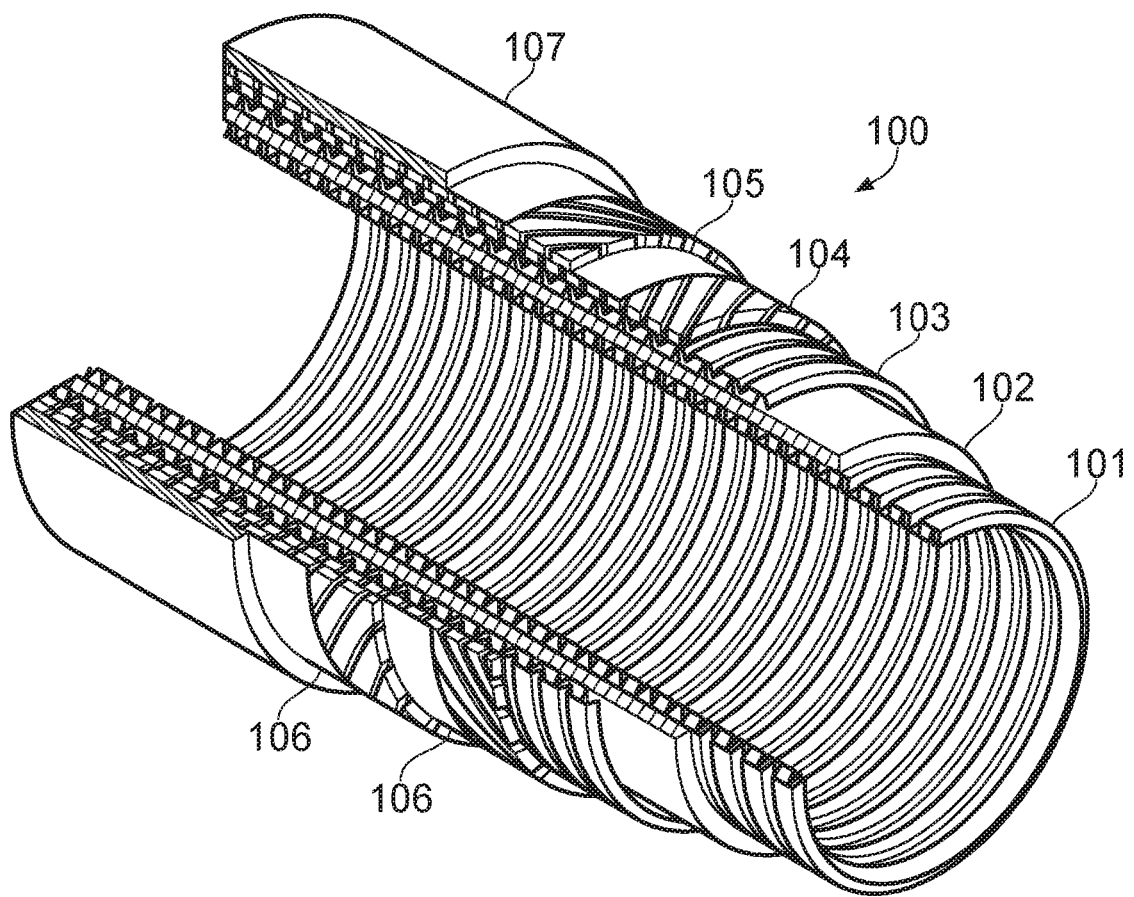
FIG. 1 illustrates flexible pipe body.

Turning to FIG. 1 it will be understood that the illustrated flexible pipe is an assembly of a portion of pipe body and one or more end fittings in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. It is to be further noted that the layer thicknesses are shown for illustrative purposes only. As used herein, the term "composite" is used to broadly refer to a material that is formed from two or more different materials, for example a material formed from a matrix material and reinforcement fibres.

The pipe body illustrated in FIG. 1 includes an innermost carcass layer 101. The carcass is a pressure resistant layer that provides an interlocked construction that can be used as the innermost layer to prevent, totally or partially, collapse of an internal pressure sheath 102 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials.

The internal pressure sheath 102 acts as a fluid retaining layer and comprises a polymer layer that ensures internal fluid integrity. The layer provides a boundary for any conveyed fluid. It is to be understood that this layer may itself comprise a number of sub-layers. It will be appreciated that when the carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a pressure resistant layer that provides a structural layer that increases the resistance of the flexible pipe to internal and external pressure and mechanical crushing loads. The layer also structurally supports the internal pressure sheath, and consists of an interlocked construction of wires with a lay angle close to 90°. Aptly the pressure armour layer is a metallic layer. Aptly the pressure armour layer is formed from carbon steel, aluminium alloy or the like. Aptly the pressure armour layer is formed from a composite, polymer, or other material, or a combination of materials.

The flexible pipe body also includes an optional first tensile armour layer 104 and optional second tensile armour layer 105. Each tensile armour layer is used to sustain tensile loads and internal pressure. The tensile armour layer is formed from a plurality of metallic wires (to impart strength to the layer) that are located over an inner layer and are helically wound along the length of the pipe at a lay angle typically between about 10° to 55°. The tensile armour layers are optionally counter-wound in pairs. Aptly the tensile armour layers are metallic layers. Aptly the tensile armour layers are formed from carbon steel, aluminium alloy or the like. Aptly the tensile armour layers are formed from a composite, polymer, or other material, or a combination of materials.

The flexible pipe body shown also includes optional layers of tape 106 which help contain underlying layers and to some extent prevent abrasion between adjacent layers. The tape layer may optionally be a polymer or composite or a combination of materials. Tape layers can be used to help prevent metal-to-metal contact to help prevent wear. Tape layers over tensile armours can also help prevent "birdcaging".

The flexible pipe body also includes optional layers of insulation and an outer sheath 107, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
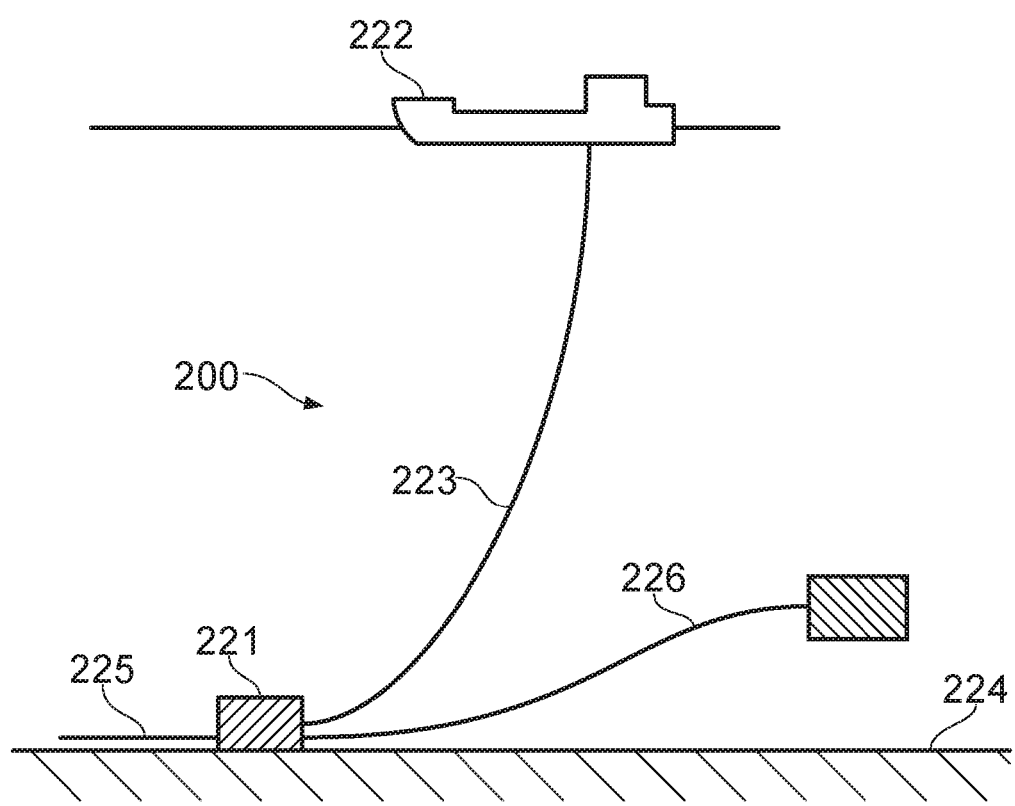
FIG. 2 illustrates flexible pipes.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line. The flexible flow line 225 comprises a flexible pipe, wholly or in part, resting on the sea floor 224 or buried below the sea floor and used in a static application. The floating facility may be provided by a platform and/or buoy or, as illustrated in FIG. 2, a ship. The riser assembly 200 is provided as a flexible riser, that is to say a flexible pipe 223 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free, catenary riser), a riser restrained to some extent (buoys, chains), totally restrained riser or enclosed in a tube (I or J tubes). FIG. 2 also illustrates how portions of flexible pipe can be utilised as a jumper 226.

Figure 3:
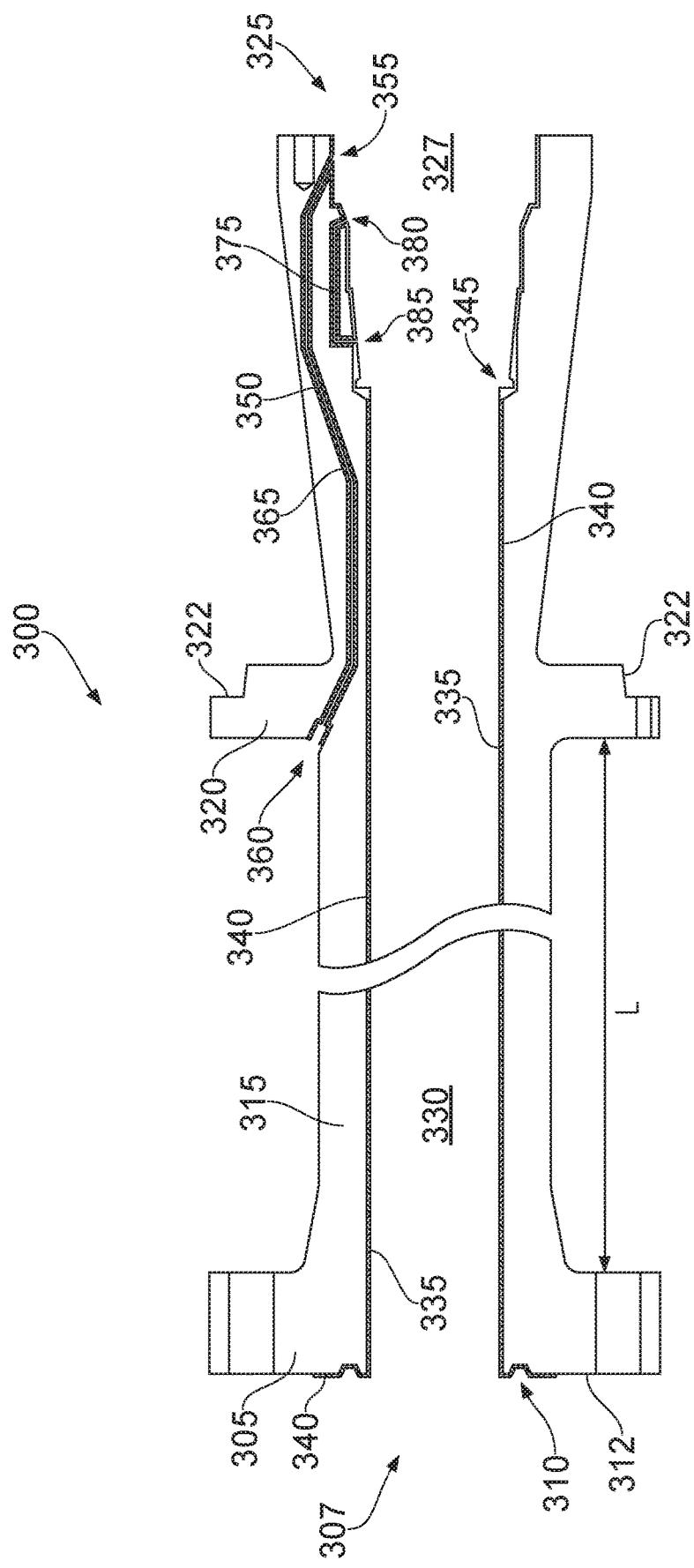
FIG. 3 illustrates a main body component of an end fitting.

FIG. 3 illustrates a main body 300 of an end fitting for a flexible pipe. The main body 300 is an example of a component part of an end fitting. Other examples of a component parts are the jacket or inner collar or the like. The main body 300 includes a flanged end region 305 at a first end 307 of the main body. The flange is usable to secure the main body and thus the end fitting to a further end fitting in a back-to-back configuration or alternatively to a rigid structure. A seal ring groove 310 is provided on an end surface 312 of the flange to help provide a fluid seal when the end fitting is secured to another element. The main body 300 of the end fitting includes a neck region 315 having a length L. As the neck 315 extends away from the flange 305 the neck extends into a further flared out region 320 which includes a seat surface 322 for receiving an end fitting jacket. The end fitting jacket (not shown) is secured to the main end fitting body to provide a space between the jacket and the main body where wires of the flexible pipe body can be terminated.

The main body 300 of the end fitting flares radially outwardly towards a remaining end 325 of the main body part. The open end defines an open mouth 327 in which various layers of the flexible pipe body can be terminated. An inner bore 330 for the end fitting is partially defined by an inner surface 335 of the end fitting main body. The diameter of the inner surface 335 which helps define the bore 330 is substantially equal to or exactly equal to a diameter of an inner bore of the flexible pipe body which is to be terminated in the end fitting.

The main body 300 of the end fitting shown in FIG. 3 is manufactured via an additive manufacturing process from a base material that is rigid and provides desired physical characteristics. One or more regions of at least one further material are integrally formed with the regions of the base material as part of the additive manufacturing process. The end fitting main body shown in FIG. 3 is made from low alloy steel. Aptly as an alternative the base material of the end fitting component part 300 could be super duplex stainless steel, nickel alloy or the like. For the end fitting shown in in FIG. 3 a 3 mm nickel alloy layer 340 is formed integrally with the base material as part of the additive manufacturing process. The nickel alloy layer 340 extends along the entire inner surface of the bore and into the seal ring groove 310 at the securing end of the end fitting. The layer also extends into a region of extra cladding 345 again formed as part of the additive manufacturing process so as to be integrally formed with the base material. The layer can thus have a variable thickness where desired. Aptly extra nickel alloy layer thickness enables precision machining. Aptly the layer of nickel alloy is about around 1 to 5 mm in thickness. Aptly the layer is 2 to 4 mm in thickness. Aptly the layer is a nickel alloy 625 layer. Aptly the layer is a corrosion resistant alloy layer. Aptly the layer is an austenitic stainless steel. Aptly the layer is a 25 chromium containing super duplex material. It will be appreciated that a thin layer of corrosion resistant material can be provided anywhere that is desired as part of the manufacturing process. Likewise materials can be used in selected regions that have other desired physical characteristics such as hardness, softness, degree of stiffness or the like.

A first fluid communication passageway 350 extends from an opening 355 at the open mouth end 325 of the end fitting component 300 and then extends via a non-linear pathway through the main body of the end fitting to a port 360 at a nearest external point where the passageway flares out to receive a plug or other such connector type. It will be appreciated that the inlet and exit ends of the fluid communication passageway could be located at any desired location near internal surfaces and/or external surfaces of the end fitting component part 300 with a communication pathway connecting the ports appropriately. Likewise the ports can have any desired shape and size according to use. As illustrated in FIG. 3 a corrosion resistant layer 365 is provided via an additive manufacturing technique to be integrally formed with the base material where the bore of the fluid communication passageway is provided through the end fitting component part 300. The surface layer surrounding the passageway is 3 mm in thickness although other thicknesses could of course be provided.

A further fluid communication passageway 375 extends between two internal locations of the end fitting body in the mouth area 327. A first opening 380 is fluidly connected by the substantially U-shaped passageway 375 to a further opening 385. This passageway is useful for communicating fluid pressure between a double seal arrangement when flexible pipe body is terminated in the end fitting body.

Figure 4:
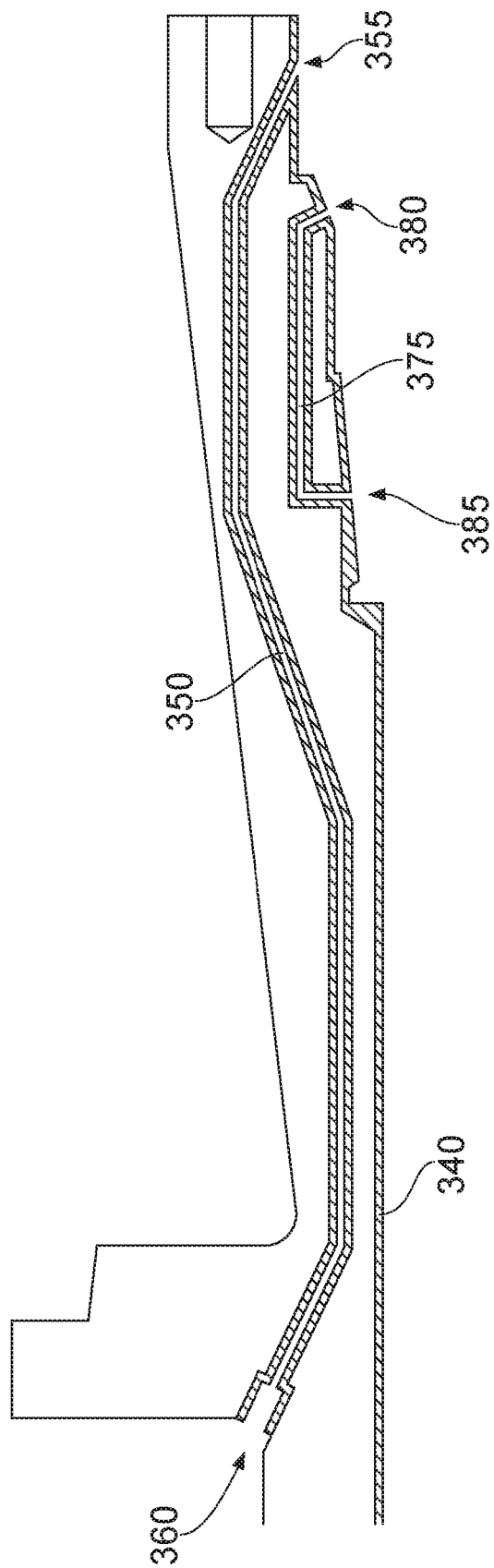
FIG. 4 illustrates a region of the component part of the end fitting shown in FIG. 3 in more detail.

FIG. 4 illustrates a region of the end fitting body 300 shown in FIG. 3 in more detail. FIG. 4 helps illustrate the fluid communication passageway 350 which extends between a fluid communication port 355 formed on an inner surface of the main body of the end fitting and a fluid communication port 360 formed on what in use would be an external surface of the end fitting. The ports 355, 360 may be inlet or outlet ports depending upon a direction of flow of fluid along the fluid communication passageway. It will be appreciated that multiple fluid communication passageways linking corresponding openings may be provided circumferentially around the end fitting and extending through the main body of the end fitting. Alternatively one or just a small number of fluid communication passageways may be formed with multiple ports (more than the number of passageways) each connected to a main passageway via a auxiliary connecting passageway (not shown). Through such an arrangement multiple vents may be connected to multiple communication passageways so that, should there be any blockage in any one of those passageways/fluid communication ports (vents), the gas pressure can still be released to the outside of the end fitting through other, connected fluid communication ports. Aptly an annular communication passageway is provided within the end fitting connecting all circumferential fluid communication ports 360 together. Aptly there are at least three ports in the end fitting. Each fluid communication passageway is formed as a void space in the material of the end fitting component part as it is formed via an additive manufacturing step as a Near Net Shape (NNS) precursor. This is described in more detail below. As the material of the end fitting main body is generated layer-by-layer via the additive process void space is left in adjacent layers to create the void space or open space that ultimately forms the fluid communication passageway. In a similar way the regions surrounding the void space, or indeed regions within the body away from the surface, can be formed via the additive manufacturing process using materials having physical characteristics selected according to the environmental factors expected to be experienced in the fluid communication passageway 350 (or other locations). For example a temperature of fluid flowing along the passageway and/or a level of acidity expected by the fluid. Aptly the fluid communication passageway can be used to vent an annulus region of a flexible pipe. If the flexible pipe is in "sour service" the vent gases may be expected to have an acidic nature. Thus including a corrosion resistant alloy material as a layer around any fluid communication passageway as that passageway is created in a Near Net Shape precursor means that in use annulus gases can be vented without fear of cracking of any material of the main body of the end fitting. It will be appreciated that additional fluid communication pathways can be provided via conventional techniques.

As illustrated in FIG. 4 both the main fluid communication passageway 350 and the further fluid communication passageway 375 have a non-linear pathway. That is to say whilst one or more parts of the passageways may be linear, overall the passageways do not just follow a straight pathway but can be serpentine or labyrinthine or U-shaped or C-shaped or the like. The creation of fluid communication passageways in a main body component part of an end fitting via an additive manufacturing process provides the option to provide fluid communication passageways in locations and following pathways which would not otherwise be possible via conventional techniques when such passageways must by necessity only be formed by drilling in a straight line from various directions into the material of the main body. It may be noted that a whole length of the internal surface of the passageway 350 may not be machined to a finished dimension as there are limited means to perform machining through the convoluted route of the passageway, hence the Near Net Shape precursor in such locations are final shape. An NNS precursor can thus include surfaces that provide final surfaces in a corresponding component part. Aptly continuity of fluid communication through such passageways can be confirmed through a conventional gas/water pressure/flow test.

FIG. 4 helps illustrate how the nickel layer 340 can be provided on what would commonly be referred to as the whetted inner bore surface of the end fitting main body part. It will be understood that in contrast to conventional techniques when such a layer would have to be provided in a separate step of cladding, use of an additive manufacturing technique means that this surface layer can be created as part of the additive manufacturing process so that the surface layer is integrally formed with a remainder of the material of the main body of the end fitting component. It will be appreciated that surface regions such as the region 340 or internal regions such as the surrounding regions surrounding the fluid communication passageway 350 can be formed of various materials so as to be integrally formed with the base material according to certain embodiments of the present invention.

Figure 5:
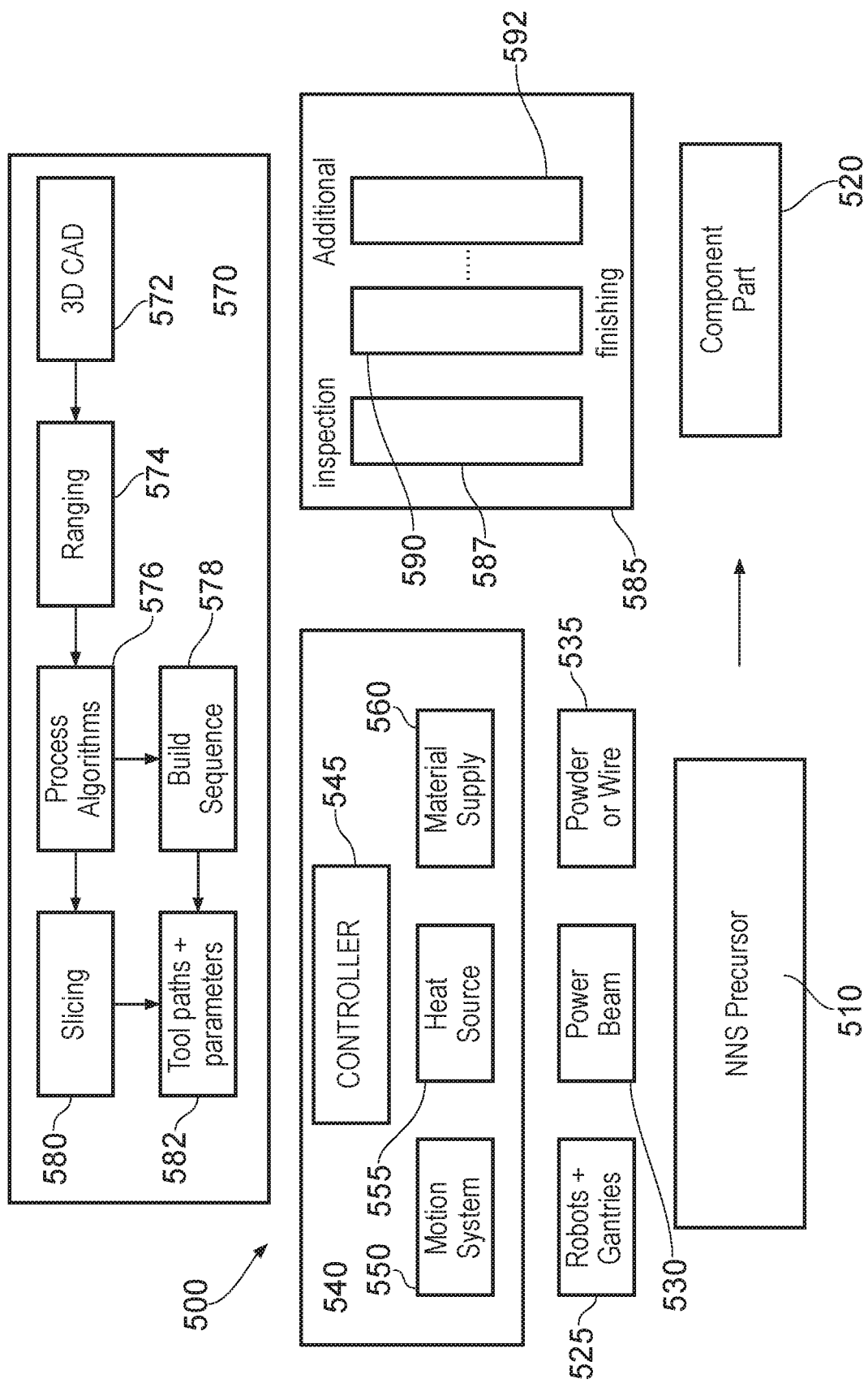
FIG. 5 illustrates use of a manufacturing cell for generation of a component part.

FIG. 5 helps illustrate an additive manufacturing cell 500 which can be used to construct an NNS precursor 510. The NNS precursor 510 is a body having a shape and configuration which is nearly equal to or shares many characteristics with an end component part 520.

The component part 520 which is the final finished component part of an additive manufacturing process could, for example, be the main body 300 of the end fitting previously described. Certain embodiments of the present invention can use a wide range of metal additive manufacturing techniques to create the NNS precursor 510. For example the process can be an additive layer manufacture, laser cladding, buttering, digital manufacture, direct light fabrication, direct metal casting (DMC), direct metal (laser) deposition (DM(L)D), laser direct casting or deposition, laser casting, laser clad casting, laser consolidation, laser cusing, laser engineered net shaping (LENS), lasform, laser melting, (metal) rapid prototyping, net shape manufacture, net shape engineering, shaped deposition manufacturing, shape melting, selective laser sintering (SLS), selective laser melting (SLM), shaped metal deposition (SMD), shape melting technology (SMT), shape welding, solid freeform fabrication (SFF) process, hot isostatic pressing (HIP) or the like. The additive manufacturing cell used to create the NNS precursor 510 shown in FIG. 5 is a wire and arc additive manufacture (WAAM) cell which creates the NNS precursor via weld build up using a wire material supply and arc based heat source such as a welding torch.

In more detail one or more robots 525 (and/or gantries) are utilised to selectively locate a focussed welding torch 530 which provides a power beam. For example one or more Fanuc robots or the like can be utilised. Wires 535 of desired materials are likewise guided by the robots and gantries to a deposition point on a substrate upon which the NNS precursor 510 is constructed. It will be appreciated that whilst certain embodiments of the present invention are being described as being wire based in terms of their source of material, powder based techniques can be utilised or a mixture of wire and powder. Wire based techniques provide a relatively high deposition rate and high material efficiency with low risk of defect and thus low part cost. The core additive layer manufacture hardware illustrated as a hardware unit 540 includes a controller 545 which communicates with a motion system 550 which controls the robots and gantries 525. Likewise the controller 545 controls operation of the heat source 555 which, in the embodiment shown, is a cold metal transfer (CMT) unit which creates a power beam 530 and of which there may optionally be a plurality providing the various material types in parallel or in sequence. The controller also helps drive the material supplies 560 which selectively provide wire of desired materials at desired locations as the deposition point provided by the power beam 530 is moved to generate the NNS precursor 510 being formed on the substrate (see below).

The control system and software unit 570 includes a data input module 572 which provides geometric data input, such as for example a 3D CAD input or the like for the NNS precursor 510. An output from this module is provided to a ranging module 574 which generates wall width ranges for the NNS precursor 510 responsive to the input geometric data. A process algorithms module 576 receives the wall width range output from the ranging module 574 and provides an input into a build sequence strategy module 578 and slicing module 580 responsive thereupon. Outputs from the slicing module 580 and build sequence module 578 are used by a paths and process module 582 which develops tool paths to be followed and process parameters to be set responsive to the shape and configuration of the NNS precursor to be manufactured and material costs etc. An output from the control system and software unit 570 is provided to the controller 545 for controlling the motion system, heat source and material supply appropriate for the design and materials being used.

Subsequent to generation of the NNS precursor 510 the precursor 510 is delivered to a post processing sub station 585 of the additive manufacturing cell 500. Here an inspection module 587 is used to inspect the shape and configuration of the NNS precursor 510 and determine any defects or other related characteristics. Aptly the elements of the inspection module 587 such as cameras, lasers or the like are provided with control via the controller 545 in the core hardware unit 540. Alternatively or additionally manual measurement using Vernier/micrometer measurements and the like may be utilised. Additional non-destructive testing, for instance ultrasonic inspection or magnetic particle inspection or the like may be utilised for quality control purposes. The results of the inspection module 587 are provided to a finishing module 590 and other additional processes modules 592 which are likewise provided with control via the controller 545. Aptly a multi tool programmable CNC machining centre is used for the finishing process. A Holyroyd Edgetek 5-axis grinding system can optionally be used as part of an additional process. Taking in the NNS precursor 510 these post production steps can be used to provide the end component part 520.

It will be appreciated that as part of the manufacturing process in which the NNS precursor 510 is manufactured layer-by-layer, certain work piece processing steps can be carried out. For example to assist in the control of the micro structure of the precursor rolling can optionally be carried out on the top of the most recently applied layer. That is to say subsequent to generation of a layer of the precursor a roller element can be applied having a desired cross sectional profile. A pressure is applied by the roller to help reduce distortion of the precursor 510 as it is created and to help control bead geometry. Aptly a rolling pressure of between 30 kN and 100 kN is applied. Aptly a rolling force of about around 70 to 80 kN is applied. Rolling introduces deformation nucleation sites and stored energy into large grains of certain materials. This helps induce recrystallization when layers are reheated during a subsequent deposition step and thus helps produce a desirable micro structure in the NNS precursor as it is generated.

FIG. 6a illustrates an example of an NNS precursor. As illustrated in FIG. 6a the precursor 510 includes material having a general shape based upon an end shape of a main body end fitting component part as previously described. Precursors for other component parts of an end fitting would of course have a general shape associated with that component part. The NNS precursor $510_a$ illustrated in FIG. 6a includes a core region 600, which is the material which is ultimately retained to provide the component part 520, and waste material 620. This waste material 620 which is formed as part of the additive manufacturing process is the material which can be identified via the inspection module 587 and then removed via the finishing module 590 and any additional procedures module 592. For example the waste material 620 can be removed via a machining stage in which excess deposited material is removed. FIG. 6b illustrates an alternative NNS precursor $510_b$ including the core material 600 and excess waste material 630. The waste material 630 illustrated in FIG. 6b is waste material created by making the NNS precursor $510_b$ slightly over size relative to an end component part wherein the waste material 620 illustrated in FIG. 6a is generated by merely selecting to manufacture the NNS precursor 510, having a block-like end region.

FIG. 7 illustrates a plate-like substrate 700 which optionally forms the starting point of an additive manufacturing process. The planer substrate 700 has a substantially flat substantially rectangular configuration having a rectangular upper surface 710 a lower spaced apart substantially parallel lower surface 720, two opposed long edges 730 and two spaced apart short side edges 740. The NNS precursor 510 is built up from one selected surface from such a substrate. Alternatively the NNS precursor 510 can be generated extending outwardly from both surfaces 710, 720 by selectively rotating the substrate in a controlled way prior to depositing material layer-by-layer on top of each side. It will be appreciated that in this latter mode of operation at least a portion of the substrate remains in the final NNS precursor and the final component part. By contrast with the former technique of creating the NNS precursor 510 from just one side of the substrate the substrate can be removed as part of a final processing step or optionally a portion of the substrate can be used at an end of the end component part 520. The substantially planer substrate 700 illustrated in FIG. 7 can be formed from a material which matches the base material of the end component part 520 or alternatively can be selected from a material having physical characteristics selected for performance purposes where the part of the substrate in any finished component part 520 is to be located.

FIG. 8 illustrates an alternative substrate 800 which can be utilised to form the starting substrate for an NNS precursor 510. Other non planar substrates having various shapes and configurations could of course be utilised according to certain other embodiments of the present invention. The substrate illustrated in FIG. 8 is a substantially tubular structure. That is to say the ends have a substantially circular shape and have circular ends 810, 820 separated by a hollow cylindrical body 830 having a smooth cylindrical inner surface 840 and a smooth cylindrical outer surface 850. As with the substrate 700 illustrated in FIG. 7 the substrate illustrated in FIG. 8 can form the basis of a part of the final finished component part 520 or can be removed as part of a finishing processing step. Likewise the cylindrical substrate can be formed from a material having characteristics which are desired in the end component part 520 if the substrate is to remain part of that component or of a different material (perhaps a cheaper material) if the substrate is eventually to be removed as part of the post processing process. Aptly the substrate 800 is a nickel alloy body and is used to provide an inner layer for the whetted surface.

FIG. 9 illustrates a main body 900 of an alternative end fitting for a flexible pipe. The main body 900 is an example of a component part of an end fitting. As with the main body 300 shown and described with respect to FIG. 3 the main body 900 illustrated in FIG. 9 includes a flanged end region 905 at a first end 907 of the main body. The flange is usable to secure the main body and thus the end fitting to a further end fitting in a back-to-back configuration or alternatively to a rigid structure. A seal ring groove 910 is provided on an end surface 912 of the flange to help provide a fluid seal when the end fitting is secured to another element. The main body 900 of the end fitting includes a neck region 915 having a length M. As the neck 915 extends away from the flange 905 the neck extends into a further flared out region 920 which includes a seat surface 922 for receiving an end fitting jacket. The end fitting jacket (not shown) is secured to the main end fitting body 900 to provide a space between the jacket and the main body where wires of the flexible pipe body can be terminated.

The main body 900 of the end fitting flares radially outwardly towards a remaining end 925 of the main body component part. The open end defines an open mouth 927 in which various layers of the flexible pipe body can be terminated. An inner bore 930 of the end fitting is partially defined by an inner surface 935 of the end fitting main body. The diameter of the inner surface 935 which helps define the bore 930 is substantially equal to or exactly equal to a diameter of an inner bore of the flexible pipe body which is to be terminated in the end fitting.

The main body 900 of the end fitting shown in FIG. 3 is manufactured via an additive manufacturing process in a manner similar to that described above. The main body 900 illustrated in FIG. 9 helps illustrate how an additive manufacturing process can be used to generate passageways which connect internally within the body of a component part of an end fitting. In more detail a first fluid communication passageway 950 is illustrated in FIG. 9 as extending from an opening 955 which can be used as an inlet/outlet port to a remaining end where the passageway 950 opens into and is in fluid communication with a further communication passageway 975. This further fluid communication passageway 975 is a straight bore through the flared out region 920 of the main body. By creating a straight or at least relatively straight passageway through this flared out region 920 fibre optic components or other elongate elements can be duly located through an end fitting along a length of flexible pipe as desired. The further fluid communication passageway 975 can additionally or optionally or alternatively carry out a further purpose which is forming a part of a fluid communication passageway which can be used to vent an annulus of the flexible pipe via the primary fluid communication passageway 950.

As illustrated in FIG. 9 the additive manufacturing process can be utilised to provide surface layers at desired locations in the end fitting main body. Aptly a corrosion resistant alloy layer 980 can be provided on the inner bore of the main body and in the area where the seal ring groove 910 is formed at the flanged end of the end fitting body. Corrosion resistant alloy can also be provided around the void spaces which create the primary and further fluid communication passageways 950, 975. Providing corrosion resistant alloy as a surface layer means sour service gaseous components can be vented without risk of cracking. A further layer 990 can be created on the jacket seat area and on a radially outer surface of the main body where wires are terminated in a space formed between the main body and the jacket.

FIG. 10 helps illustrate how flexible pipe body is terminated in an end fitting which includes a jacket 1000. The jacket 1000 shown in FIG. 10 is an example of a component part of an end fitting which is manufactured via an additive manufacturing process of the type described herein above. In fact in FIG. 10 the main body 1010 of the end fitting is also formed via an additive process to include layers 1020 of a corrosion resistant alloy which are integrally formed with the base material which forms the remainder of the main body 1010 of the end fitting. As illustrated in FIG. 10 the jacket 1000 is formed so as to include a fluid communication passageway 1030 which is helpful to selectively vent fluid such as accumulated gases in use.

Certain embodiments of the present invention enable the manufacture of end fitting components to be made using additive manufacturing techniques. These are not only Near Net Shape, saving on time and cost in machining, but also have integral to them surfaces and or regions having favourable physical characteristics. For example the end fitting components can have integral to them corrosion resistant surfaces both in a bore and also through orifices intended for gas venting. An advantage of certain embodiments of the present invention is that the material used for a base material of the end fitting does not require resistance to acid gas species such as $H_2S$. The exhaust of such acidic gases can otherwise lead to corrosion of through passages and lead to migration of atomic hydrogen released during the corrosion reaction to points of high stress or inclusions in the end fitting material.

It will be appreciated that certain embodiments of the present invention can provide end fitting component parts with surface regions and/or internal regions integrally formed from different materials together with through passageways. Alternatively through passageways can subsequently be formed via a conventional drilling technique.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of manufacturing a component part of an end fitting for a flexible pipe, comprising the steps of:
   via an additive process, providing a near net shape (NNS) precursor corresponding to a component part of an end fitting layer-by-layer, wherein the NNS precursor is provided with at least one region of a first material integrally formed with a base material of the NNS precursor, said base material being different from the first material, and wherein each region of the at least one region of the first material is provided at a location where a fluid communication passageway is provided in the component part;
   subsequently performing at least one post NNS processing operation on the NNS precursor to provide the component part; and
   providing the fluid communication passageway as an interconnected void space in adjacent layers in a region of the at least one region of the first material as layers of the NNS precursor are provided.

2. The method as claimed in claim 1, further comprising:
   via the void space, providing a non-linear lumen through said region.

3. The method as claimed in claim 2, further comprising:
   the non-linear lumen is provided as a lumen having a curved or labyrinthine passageway through said region.

4. The method as claimed in claim 1, further comprising:
   providing a starting preform member; and
   layer-by-layer, adding a new layer of base material and/or the first material at selected locations on an underlying layer supported via the preform member.

5. The method as claimed in claim 4, further comprising:
   providing the starter preform member by providing a starting preform member manufactured from a material that is more corrosion resistant than steel but less expensive than nickel alloy.

6. The method as claimed in claim 1, further comprising:
   determining at least one tool path for at least one tool at an Additive Manufacturing (AM) cell that performs at least a step of the additive process.

7. The method as claimed in claim 6, further comprising:
   the at least one tool comprises a deposition robot or machining robot or a part manipulator.

8. The method as claimed in claim 1, further comprising:
   providing a planar starting base plate member; and
   layer-by-layer, adding a new layer of base material and/or the first material at selected locations on an underlying layer supported via the base plate member.

9. The method as claimed in claim 1, further comprising:
   delivering a metal for the additive process as a powder or wire.

10. The method as claimed in claim 1, further comprising:
    providing geometric data input representing the component part of an end fitting.

11. The method as claimed in claim 1, further comprising:
    providing a build sequence for the additive process.

12. The method as claimed in claim 1, further comprising:
    determining at least one operation parameter for the additive process.

* * * * *